United States Patent [19]

Janniere et al.

[11] Patent Number: 5,597,990
[45] Date of Patent: Jan. 28, 1997

[54] ELECTRICAL SWITCH

[75] Inventors: Alain Janniere, Paris; Aurelien Carvalho, Sampans, both of France

[73] Assignee: ITT Corporation, New York, N.Y.

[21] Appl. No.: 336,369

[22] Filed: Nov. 8, 1994

[30] Foreign Application Priority Data

Nov. 9, 1993 [FR] France ................................. 93 13334

[51] Int. Cl.⁶ .................................................. H01H 13/00
[52] U.S. Cl. ....................................... 200/16 C; 200/52 R
[58] Field of Search ................................... 200/5 R, 5 A, 200/16 R–16 E, 52 R, 402, 405, 407–410, 416, 417, 431, 434, 435, 439, 440, 442, 447, 449, 450, 452, 453, 454, 459, 460, 468, 509, 510, 520, 521, 522, 523, 530, 531, 532, 533, 534, 535, 537, 329, 341

[56] References Cited

U.S. PATENT DOCUMENTS

| | | | |
|---|---|---|---|
| 2,661,408 | 12/1953 | Shabeck, Jr. ............................... | 200/76 |
| 3,196,230 | 7/1965 | Barden et al. ............................. | 200/76 |
| 3,253,271 | 5/1966 | Trupiano et al. ......................... | 340/280 |
| 3,624,332 | 11/1971 | Van Benschoten ...................... | 200/164 |
| 4,088,855 | 5/1978 | Emery ....................................... | 200/16 A |
| 4,303,813 | 12/1981 | Cary .......................................... | 200/52 R |
| 5,331,123 | 7/1994 | Kimbell et al. .......................... | 200/52 R |

FOREIGN PATENT DOCUMENTS

| | | | |
|---|---|---|---|
| 0234654 | 2/1987 | European Pat. Off. ......... | G06K 7/06 |
| 2468197 | 10/1980 | France ........................... | H01H 13/28 |
| 2665027 | 7/1990 | France ........................... | H01R 9/09 |
| 2210717 | 2/1989 | United Kingdom ............. | G05K 7/01 |

*Primary Examiner*—Michael L. Gellner
*Assistant Examiner*—Michael A. Friedhofer
*Attorney, Agent, or Firm*—Thomas L. Peterson

[57] ABSTRACT

Electrical switch, especially for detecting the presence of an electronic memory card in a card reader device. An electrical switch (10) includes a trigger button (14) which is slidingly mounted in a switch box (12), a mobile contact element (62) which is connected to the button (14) and which interacts with at least fixed contact element (50,52) carried by the box (12) of the switch, and a spring and the mobile contact element (44,62) elastically returns the button (14) to a stable inactive position, in which the value of the reutrn force (F) decreases when the actuation travel (C) of the button (14) exceeds a predetermined value (C1), characterized in that the predetermined value (C1) of the travel corresponds to the triggering of the switch.

6 Claims, 3 Drawing Sheets

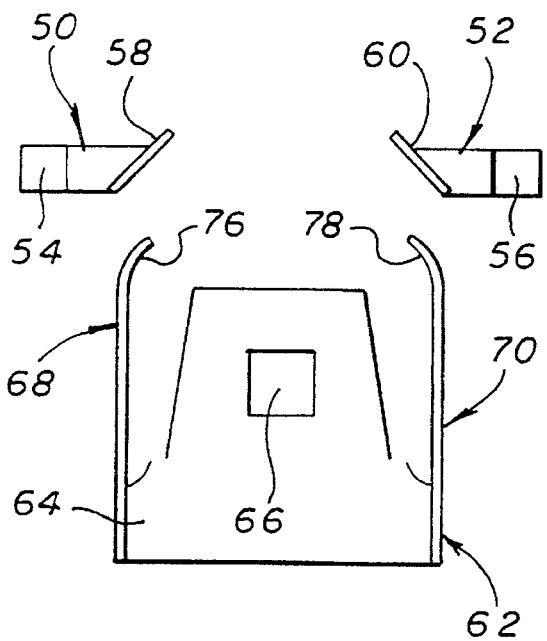
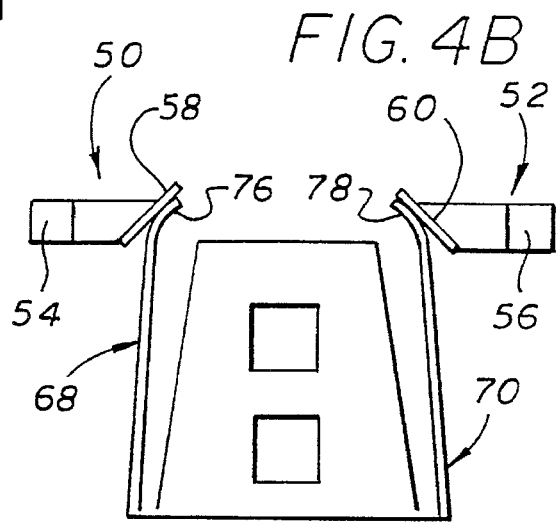
FIG. 4A
FIG. 4B
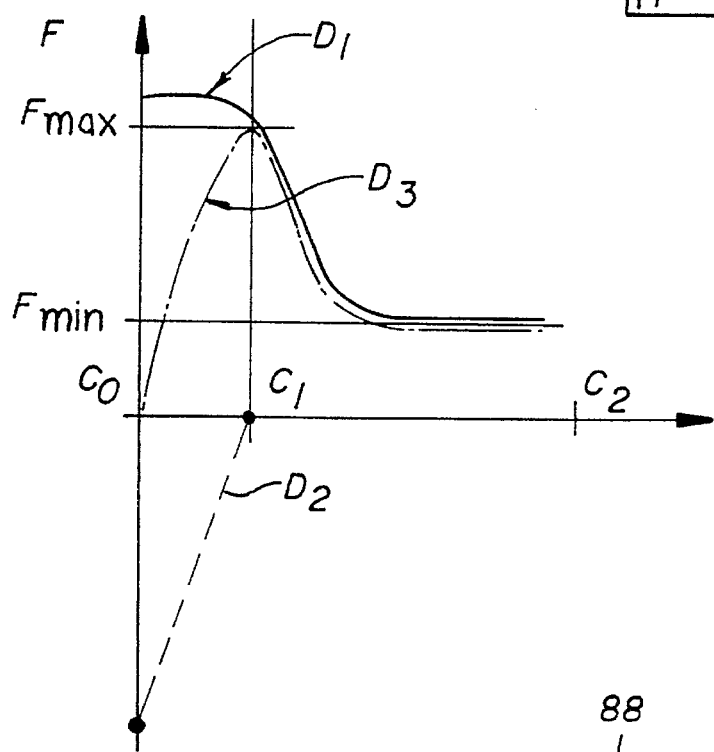
FIG. 5
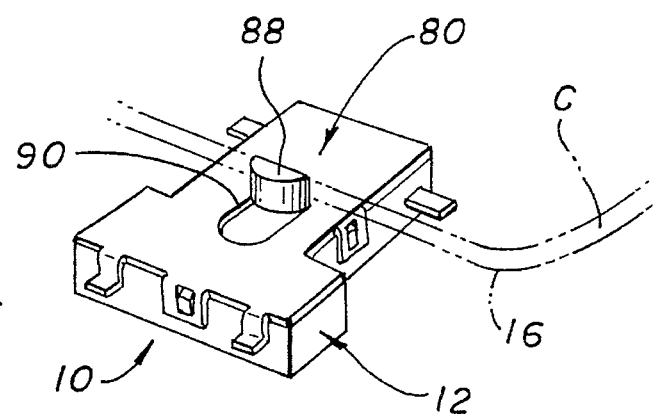
FIG. 6

ELECTRICAL SWITCH

The present invention relates to an electrical switch.

The invention more particularly relates to a switch for detecting the presence of a card in a device for reading the information contained in the card, especially an electronic memory card, of the type including a member for triggering the switch, with which the front transverse edge of the card perpendicular to the direction of insertion of the card interacts.

Document FR-A-2,607,291 describes and represents an electrical connector for an electronic memory card of the type including an electrical microcontact for detecting the position of the card, consisting of an elastically deformable detection blade, a free end of which interacts with the front transverse edge of the card which deforms it elastically to cause the electrical contact to pen or close as a function of the position of the card with respect to a support frame bearing the detection blade and bearing the contact blades of a connector for electrical connection to the conducting tracks of a card.

Such a design of an electric switch for detecting the presence of a card has numerous drawbacks.

First, in order to produce it, it requires integration of the microcontact with the connector of the card reader device and the microcontact cannot constitute an independent sub-assembly capable of being directly integrated with the box of the card reader device.

Secondly, when the card is introduced, in a position corresponding to reading of the information contained in the card, the elastically deformable blade of the switch continuously exerts on the card a repulsion force which pushes the card away from its insertion direction, the value of the repulsion force increasing substantially proportionally to the value of the insertion travel of the card into the reader device, the repulsion force furthermore increasing beyond the position of triggering the microcontact if the card executes an additional travel before reaching a fixed end-stop for the end of insertion travel.

Thirdly, this design does not make it possible to provide a significant additional travel beyond the position of triggering of the microcontact, because an excessive additional travel would risk damaging the elastically deformable blade and detrimentally affecting the sensitivity of the microcontact.

Finally, it is necessary for the sensitivity of the switch, in view of its arrangement in a card reader device, to be sufficient in order to be compatible with the wiring diagram of the microcircuit cards, which requires the switch to change state when a card is inserted after making electrical contact with the last conducting track of the card, and for it to change state again when the card is extracted before breaking electrical contact with the first conducting track of the card.

In order to overcome these drawbacks, a design has already been proposed in document FR-A-2,665,027, according to which the front transverse edge of the card interacts with a lever which extends in a plane substantially parallel to the plane of the card, and one end of which interacts with a triggering member of a switch arranged under the card. This design makes it possible to eliminate the repulsion force when the card is inserted and to allow a significant additional travel, but the lever is a component which is complex to produce and which furthermore needs to be integrated with the frame of the connector of the card reader device.

The invention is not limited to its application to detecting the presence of a card in a read/write device.

The invention also relates to an electrical switch which may, for example, be used as a manually actuated push button.

In certain applications, such a push button is operated by its user to cause implementation of an electrical function.

This is, for example, the case when it is integrated in an optical reader pen for deciphering a bar code. In such an application, the user permanently holds the reader pen and causes it to operate, in order to read a bar code, by pressing on a push button integrated with the reader pen, using a finger, for example with his/her index finger.

The end of the finger of the user is therefore permanently in contact with the push button of the switch and it is desirable, when the push button is pushed in, corresponding to actuation of the reader pen, for the return force applied to the push button to be as small as possible in order to prolonged use of the reader pen not to lead to pain for the user.

It is also desirable for the force at the start of the actuation travel of the switch to be relatively small, preferably zero, so that the user holding the pen by hand and permanently exerting a slight pressure on the push button, even when inactive, no longer suffers from the prolonged interaction of the end of his/her finger with the push button.

A design of a push-button switching element having a rapid-action elastic element has already been proposed in document FR-A-2,468,197.

The various designs proposed in this document make it possible to vary the value of the return force exerted on the push button during the actuation travel of the latter, in particular with a view to providing the user with a tactile sensation of the actuation.

However, the designs proposed in this document do not make it possible accurately to control the opening or closure of an electrical contact integrated with the switch at a precise point of its travel for actuating the push button.

The object of the present invention is to provide a novel design of an electrical switch which makes it possible to overcome the drawbacks mentioned previously.

For this purpose, the invention provides an electrical switch including a trigger button which is slidingly mounted in a switch box, a mobile contact element which is connected to the button and which interacts with at least fixed contact element carried by the box of the switch and means for elastically returning the button to a stable inactive position, in which the value of the return force decreases when the actuation travel of the button exceeds a predetermined value, characterized in that the said predetermined value of the travel corresponds to the triggering of the switch.

According to other characteristics of the invention:

the value of the return force increases then decreases during the actuation travel, passing through a maximum corresponding to triggering of the switch;

the elastic return means include at least one return spring arranged between the button and the commutator box and which pushes the button into its stable inactive position;

the return spring is an arched coil spring arranged inside the box and which extends along a transverse direction substantially perpendicular to the direction of movement of the button whose triggering end interacts with the convex central part of the arched spring;

each of the opposite ends of the spring is accommodated in a housing whose axis inclined with respect to the direction of movement of the button so as to give the spring a stable curvature at rest, the convexity of which is directed towards the triggering end of the button;

the mobile contact includes at least one elastically deformable contact blade, a free end of which interacts with the fixed contact element and which, in the inactive position of the button, exerts an elastic force on the button which opposes the force exerted on the return spring;

the contact blade extends along a direction substantially parallel to the direction of sliding of the button and its free end interacts with a ramp which is formed on the fixed contact and which is inclined with respect to the direction of movement of the button;

in the inactive position of the button, the free end of the elastically deformable contact blade is in electrical contact with the fixed contact element so as to apply to the button an elastic force opposed to that which is applied to it by the return spring;

the switch has symmetry of design with respect to a mid-plane passing through the axis of movement of the button;

the mobile contact includes two elastically deformable contact blades arranged symmetrically on either side of the body of the button;

for detecting the presence of a card in a device for reading the information contained by the card, especially an electronic memory card, an actuation end of the button projects out of the end of the box in order to interact with the front transverse end of the card perpendicular and to the direction of insertion of the card, the triggering button being slidingly mounted along a direction substantially parallel to the direction of insertion of the card.

Other characteristics and advantages of the invention will emerge on reading the detailed description which follows, in order to understand which reference will be made to the attached drawings, in which:

FIGS. 4A and 4B are two diagrams illustrating the relative positions of the mobile contact with respect to the fixed contact elements for the two main operating positions of the switch;

FIG. 5 is a force/travel diagram illustrating, in particular, the value of the elastic return force applied to the button as a function of the displacement travel of the latter; and FIG. 6 is a similar view to that of FIG. 1, illustrating a second embodiment of a switch produced according to the teachings of the invention.

The figures represent an electrical switch 10 which is intended to be integrated into a device (not shown) for reading the information contained in an electronic memory card C.

Figure 1:
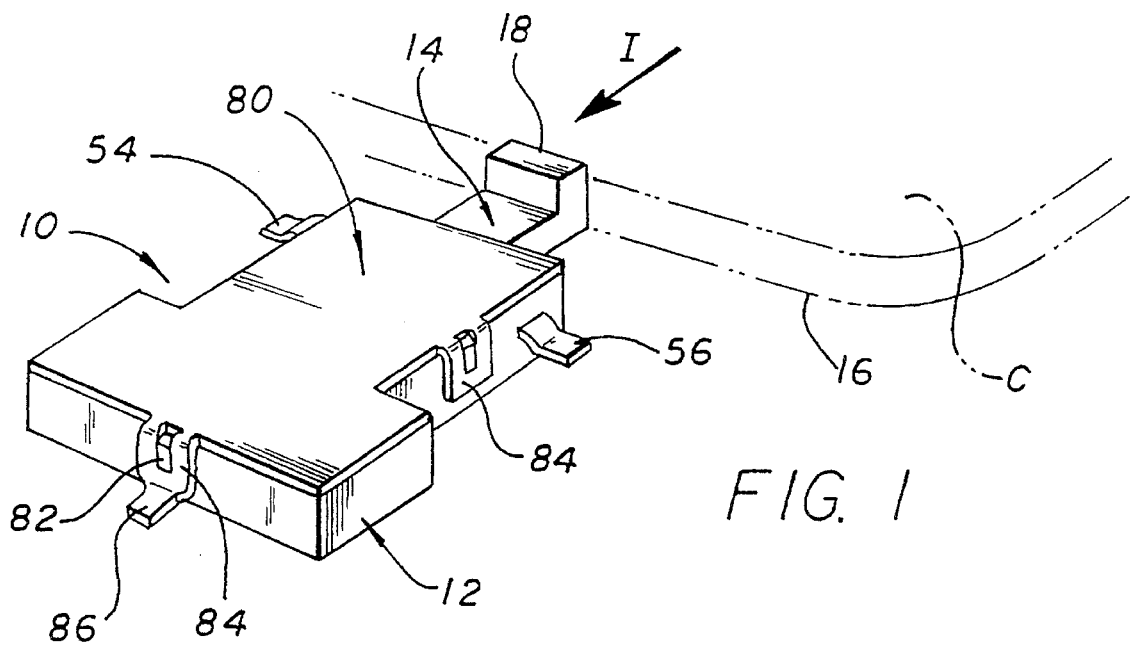
FIG. 1 is a diagrammatic perspective view illustrating a first embodiment of a switch produced according to the teachings of the invention, the button of which interacts with the front edge of an electronic memory card.

As shown in FIG. 1, the switch 10 essentially consists of a switch box 12, inside which a button 14 is slidingly mounted, to move in rearward and forward sliding directions R, F. These sliding directions are parallel to the direciton I of insertion of the card C whose front transverse edge 16 interacts with an actuation end 18 of the button 14 which projects out of the box 12.

The box 12 is a moulded part made of insulating plastic which includes a central housing 22 which accommodates, in particular, the button 14.

Figure 3:
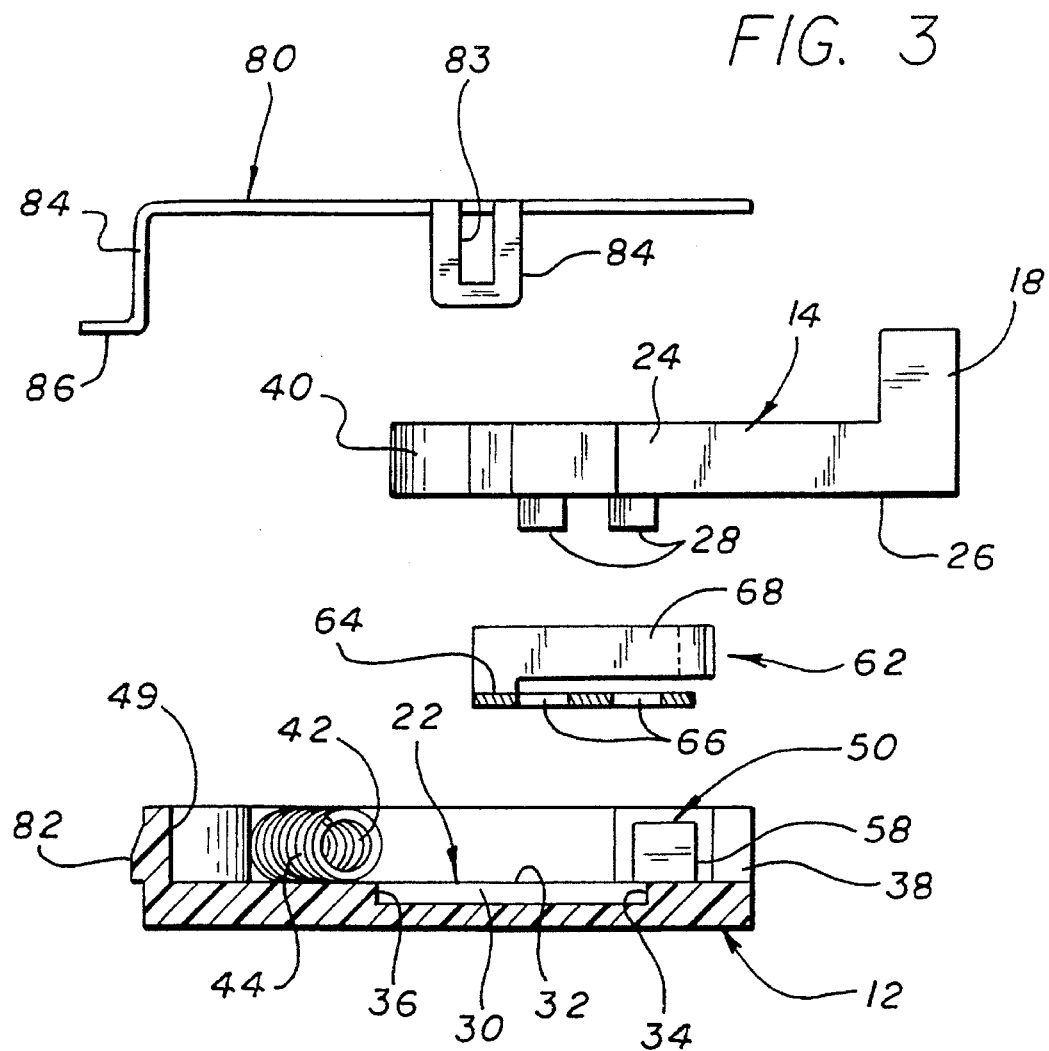
FIG. 3 is an exploded view in partial section through a vertical mid-plane of the switch illustrated in FIGS. 1 and 2.

The button 14 includes an elongate body 24 whose lower face 26, when regarding FIG. 3, includes two bosses 28 which are accommodated by sliding in a groove 30 formed in the bottom 32 of the housing 22 and whose opposite axial ends 34 and 36 constitute the mechanical end-of-travel stops of the button 14.

The drive end 18 of the button 14 projects out of the housing 22 through a window 38 formed in the transverse face of the latter which points towards the front edge 16 of the card C.

Figure 2:
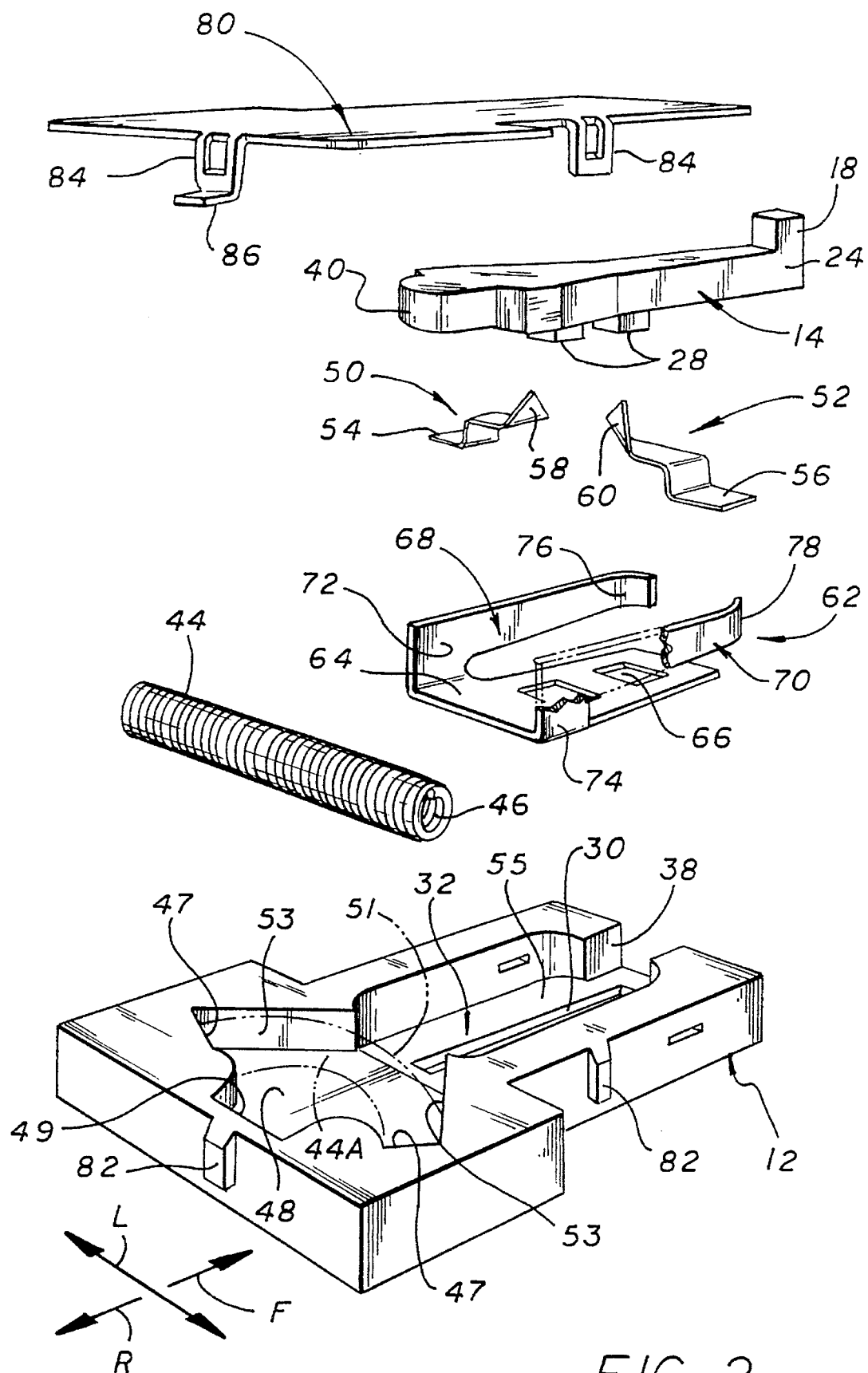
FIG. 2 is an exploded perspective view of the switch illustrated in FIG. 1.

The other end 40 of the button, hereinbelow referred to as the triggering end, which is the one opposite the actuation end 18, has a rounded profile which interacts with the arched and convex central part 42 facing it of a coil spring 44 which is arranged in the box 12 along a transverse direction substantially perpendicular to the direction of sliding of the button 14, as is illustrated in silhouette in FIG. 2.

Each of the opposite ends 46 of the spring 14 is accommodated in a lateral spring recess 48 which extends the housing 22 of the box 12 so that, when at rest, the spring 44 occupies its arched stable position illustrated in particular in FIG. 3. The spring recess has laterally spaced (in directions L) opposite fixed end walls 47 which face at least partially forwardly (in direction F) and compress the spring between them. This urges the spring to the forward bowed position shown at 44A wherein the spring middle 51 lies forward of the spring ends. The spring recess has fixed forward walls 53 abutting middle locations on the spring, to fix the orientation of the forwardly bowed spring. The spring recess 48 intersects a forward recess 55 in which the button 14 slides.

Opposite the end 40 of the button 14, the housing 22 includes a recess 49 into which the arched central part 42 of the spring 44 can be deformed when the end 40 of the button 14 acts thereon.

The body of the box 12 carries two fixed electrical contact elements 50 and 52 which are arranged laterally on either side of the body 24 of the button 14.

Each fixed contact element 50, 52 is made in the form of a folded metal blade whose free ends 54 and 56 project out of the box 12 to constitute terminals for connection and soldering on to a printed circuit board (not shown) in order to allow the switch to be mounted according to the surface mount technique.

Each fixed contact element 50, 52 includes a contact lug 58, 60 arranged inside the housing 22 and which is inclined with respect to the direction of movement of the button 14 in order to constitute a ramp whose function will be explained later.

The fixed contact elements 50 and 52 are partially embedded into the overmoulded plastic body 12 of the switch.

The switch includes a mobile contact element 62 which is in the form of a carriage fixed to the lower face 26 of the body 24 of the button.

For this purpose, the mobile contact element 62 includes a horizontal main plate 64 which includes two holes 66 of substantially rectangular cross-section through which the bosses 28 of the button 14 pass in order to link the mobile contact 62 in translation with the button 14.

The mobile contact 62 also includes two resiliently deformable electrical contact blades 68 and 70 which each extend substantially in a vertical plane perpendicular to the plane of the fastening plate 64, and each of which is made in the form of an elastically deformable bar.

Each contact blade 68, 70 is connected by one end 72, 74 to the plate 64 and extends longitudinally, that is to say parallel to the main direction of the body 24 of the button 14, to end in a free contact end 76, 78 which is slightly curved inwards and can interact with a contact lug 58, 60, forming a ramp, respectively of the fixed contact elements 50 and 52.

The box 12 of the switch whose upper face is open is closed by a metal lid 80 which constitutes a cage elastically fitted on to stubs 82 formed on the lateral and rear transverse faces of the box 12 and which are accommodated in windows 83 formed in lugs 84 of the metal lid 80 folded vertically downwards.

The rear part 84, on the left when regarding FIG. 3, is extended in a terminal 86 which complements the means for soldering of the switch 10 on to a printed circuit board and to connect the lid 80 to the earth circuit so that it constitutes protection against electrostatic interference.

The switch illustrated in FIGS. 1 to 5 is a switch which is normally in a closed position, that is to say that, in the inactive position of the button 14 which is acted on by the spring 44 and in which one of the bosses 28 bears against the axial end 34 of the groove 30, the electrical contact between the fixed contact elements 50 and 52 is made by the mobile contact 62.

As is illustrated in FIG. 4B, the resiliently deformable blades 68 and 70 are in a position against the ramp-forming lugs 58 and 60 of the fixed contact elements 50 and 52. The mobile contact element 62 applies a force to the button 14, tending to push it in the opening direction and against the return force which is applied to it by the arched spring 44.

A description will now be given of the mode of operation of the switch for detecting the presence of a card, with reference in particular to FIGS. 4A, 4B and 5.

FIG. 5 shows a first diagram D1 illustrating the value of the elastic return force applied to the button 14 by the arched spring 44 as a function of the displacement travel of the button 14 between its inactive position C0, the position C1 of triggering of the switch, that is to say the position of opening the electrical contact, and the end-of-travel position C2.

The second diagram D2 represents the value of the elastic force applied to the button 14 by the deformable blades 68 and 70 of the mobile contact 62 between the inactive position of the button and the position of opening of the contact C1, in which the blades 68 and 70 are no longer prestressed by the lugs 58 and 60 and no longer exert an elastic force on the button 14.

Finally, the diagram D3 is the resultant diagram corresponding to the sum of the diagrams D1 and D2, which illustrates the value of the resultant elastic force applied to the button 14 as a function of the displacement travel of the latter with respect to the box 12 between the positions C0 and C2.

As is shown in FIG. 5, the value of the resultant return force of the button 14 is initially practically zero but passes through a maximum Fmax substantially corresponding to the triggering position C1 of the switch 10, then decreases rapidly to reach a lower threshold residual value Fmin which corresponds to the residual value of the repulsion force applied by the switch 10 to the card C after insertion of the card.

This residual repulsion force may be particularly small and its value is perfectly controlled by the choice of the arched spring 44.

Because of the opening of the electrical contact beyond the triggering position C1 and the possibility of significantly deforming the arched central part 42 of the spring 44 into the recess 49, it is possible to provide a significant additional travel C1–C2 beyond the triggering position C1 without increasing the residual repulsion force Fmin applied to the card.

When the user withdraws the card C, the spring 44 returns to its arched rest position, while progressively increasing the value of the return force which it applies to the button 14 when approaching the switching position then corresponding to making of the electrical contact between the fixed contacts 50 and 52.

When the ends 76 and 78 of the elastically deformable blades 66 and 70 come into contact with the ramps 58 and 60 of the fixed contact elements 50 and 52, this again causes creation of an opposing elastic force which achieves a substantially zero resultant force applied to the button in its inactive position C0.

In the embodiment variant illustrated in FIG. 6, the button 14 includes a triggering lug 88 which projects vertically through a longitudinal slot 90 in the lid 80 of the switch 10 so as to allow the latter to be arranged below the plane of the card and to cause actuation of the button 14 by interaction of the front edge 16 of the card C with the lug 88 of the button.

The design according to the invention is particularly advantageous in that it makes it possible to produce a proximity switch for a card having very small dimensions, the total length of which is approximately 7 mm and the thickness is 1.5 mm, with a triggering travel C1=0.3 mm, a total travel C2=1.3 mm and a residual repulsion force Fmin<0.2N.

Because of the presence of a relatively large additional travel C1–C2, the switch according to the invention can be easily mounted according to the surface mount technique and using a machine for automatically implementing this technique, without requiring the switch to be positioned on a printed circuit card, the precision of which would exceed that of the precision of positioning of components by this type of machine.

We claim:

1. An electrical switch comprising:

a housing forming a stop;

first and second contact elements mounted on said housing;

a button that is slidably mounted on said housing to move in forward and rearward sliding directions, between closed and open button positions, said button being biased toward movement in said forward direction against said stop;

a mobile contact connected to said button to move with said button;

said mobile contact having at least one resiliently deformable contact blade that has a free end portion, and in said closed button position said first contact element engages and exerts a rearward force on said blade free end portion to urge said mobile contact and said button rearwardly.

2. The switch described in claim 1 wherein:

said contact blade extends primarily in said sliding directions, said blade free end portion is deflectable in sideward directions that are primarily perpendicular to said sliding directions, and said first contact element has a ramp that is inclined from said sliding directions and that applies a force in one of said sliding directions to said blade free end portion when said first contact element is engaged with said blade free end portion.

3. The switch described in claim 1 wherein:

said mobile contact has two resiliently deformable blade elements, including said contact blade, with each blade element having a free end portion engaged with a different one of said contact elements.

4. An electrical switch comprising:

a housing forming a stop;

first and second contact elements mounted on said housing;

a button that is slidably mounted on said housing to move in forward and rearward sliding directions, between closed and open button positions;

a mobile contact connected to said button to move with said button, said mobile contact having a pair of contact ends that engage said contact elements to connect said contact elements in said closed button position;

a coil spring having opposite ends and a middle;

said housing having a forward recess, including a front and a rear, in which said button slides and a spring recess at the rear of said forward recess, with said spring lying in said spring recess, said recess having laterally opposite fixed end walls spaced apart in lateral directions that are perpendicular to said sliding directions, with said fixed end walls facing at least partially forward to urge said spring into a forward bowed shape wherein said spring middle lies forward of said spring opposite ends, said recess having fixed forward walls abutting locations on said forward bowed spring that are spaced from said spring ends to fix an orientation of said forward bowed spring.

5. The switch described in claim 4 wherein:

said fixed forward walls of said spring recess, include a pair of forward walls lying at laterally opposite sides of said forward recess, with each forward wall engaging said spring middle.

6. An electrical switch comprising:

a housing forming a stop;

first and second fixed contact elements mounted on said housing;

a button that is slidably mounted on said housing to move in forward and rearward sliding directions, between closed and open button positions;

a coil spring extending largely perpendicular to said sliding directions, said spring being forwardly bowed and engaging said button and biasing said button in said forward direction against said stop;

a mobile contact connected to said button to move with said button;

said mobile contact having a pair of connected-together resiliently deformable contact blades that each has a free end portion engaged with one of said contact elements in said closed position of said button, with said free end portions moving out of engagement with said contact elements as said button moves to said open position.

* * * * *